United States Patent [19]

Murata et al.

[11] Patent Number: 5,055,737
[45] Date of Patent: * Oct. 8, 1991

[54] LUMINESCENT SCREEN

[75] Inventors: Yasushi Murata; Fumio Matsui, both of Saitama, Japan

[73] Assignee: Pioneer Electronic Corporation, Tokyo, Japan

[ * ] Notice: The portion of the term of this patent subsequent to Dec. 11, 2007 has been disclaimed.

[21] Appl. No.: 380,449

[22] Filed: Jul. 17, 1989

[30] Foreign Application Priority Data

Jan. 17, 1989 [JP] Japan ..................................... 1-8389

[51] Int. Cl.$^5$ ............................................. H01J 29/20
[52] U.S. Cl. ................................... 313/524; 313/463; 313/474; 250/483.1
[58] Field of Search ............... 313/371, 474, 463, 524; 250/483.1, 486.1

[56] References Cited

U.S. PATENT DOCUMENTS

| 4,298,820 | 11/1981 | Bongers et al. | 313/463 |
| 4,835,437 | 5/1989 | Berkstresser et al. | 313/474 |
| 4,977,326 | 12/1990 | Murata | 250/483.1 |

Primary Examiner—Donald J. Yusko
Assistant Examiner—Diab Hamadi
Attorney, Agent, or Firm—Fleit, Jacobson, Cohn, Price, Holman & Stern

[57] ABSTRACT

A luminescent screen includes a screen plate containing a substance capable of emitting luminescent light in response to stimulating light applied thereto, and a regular array of convexes on one surface of the screen plate for trapping emitted luminescent light that is directed into the screen plate and for directing the trapped luminescent light toward a display surface of the screen plate. The brightness of the display surface is therefore increased.

5 Claims, 1 Drawing Sheet

LUMINESCENT SCREEN

BACKGROUND OF THE INVENTION

1. Field of the Invention

The present invention relates to a luminescent screen, and more particularly to a luminescent screen having a screen plate containing a substance capable of emitting light in response to stimulating light applied thereto.

2. Description of the Prior Art

There are known display systems having a luminescent screen comprising a screen plate which contains a substance (a luminescent substance) capable of fluorescence or phosphorescence in response to stimulating light such as ultraviolet radiation, visible light, near-infrared radiation, or the like, the fluorescent substance comprising a piperidinium tetra (benzoyltrifluoroacetone) europium complex, for example. The stimulating light is applied to the screen plate to enable the screen plate to display an image.

Heretofore, the screen plate has generally been in the form of a flat plastic plate. As shown in FIG. 1 of the accompanying drawings, when stimulating light is applied to a plastic screen plate 20, luminescent light is emitted from a luminescent substance (indicated by a star-shaped symbol) and scattered in every direction as indicated by the broken lines. More specifically, the emitted luminescent light is directed toward display and reverse surfaces of the screen, and also propagated in the screen plate 20. Therefore, The efficiency with which the applied stimulating light is utilized is low, and the intensity of luminescent light emitted toward the display side of the screen plate is so low that the screen as viewed by the viewer is relatively dark.

SUMMARY OF THE INVENTION

In view of the aforesaid drawbacks of the conventional luminescent screen, it is an object of the present invention to provide a luminescent screen which emits luminescent light of an increased intensity toward a display side for a greater degree of screen brightness in response to a reference intensity of stimulating light applied to the screen.

According to the present invention, a luminescent screen comprises a screen plate containing a substance capable of emitting luminescent light in response to stimulating light applied thereto, and a regular array of convexes on one surface of the screen plate.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
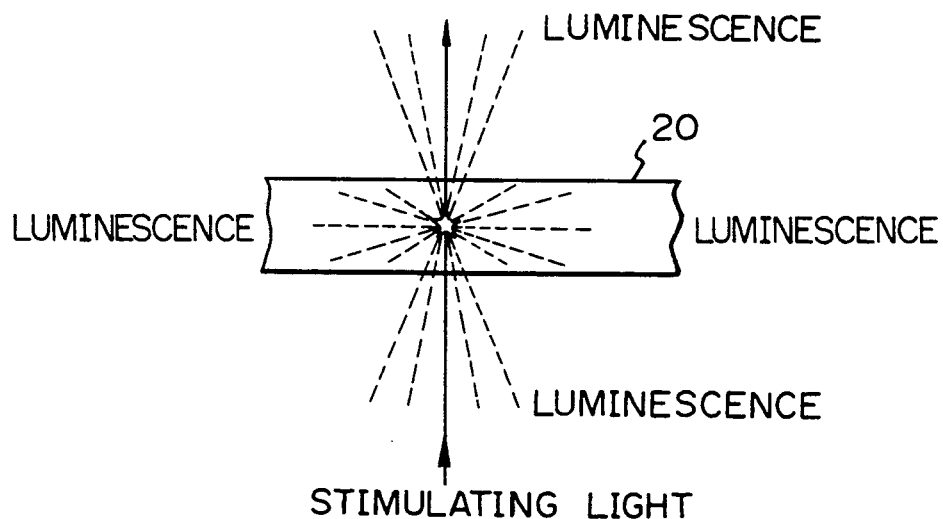
FIG. 1 is a fragmentary cross-sectional view of a conventional luminescent screen.
Figure 2:
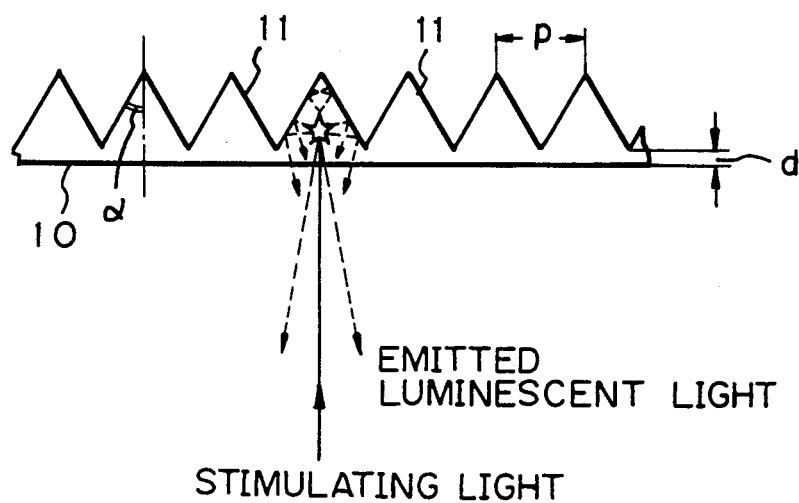
FIG. 2 is a fragmentary cross-sectional view of a luminescent screen according to an embodiment of the present invention.

FIG. 2 shows a luminescent screen according to an embodiment of the present invention. The luminescent screen includes a screen plate 10 made of plastics. Stimulating light (indicated by the solid line) such as ultraviolet radiation or the like is applied as a spot to the screen while the spot is being two-dimensionally scanned over the screen. A luminescent substance indicated by the star-shaped symbol is responsive to the applied stimulating light for emitting luminescent light as indicated by the broken lines. The size of a pixel is governed by the size of the spot applied to the screen.

The luminescent screen shown in FIG. 2 is constructed so as to be incorporated in a front projector. The screen includes a regular array of convexes such as conical projections 11 disposed on the reverse surface of the screen plate 10 which is opposite to the surface thereof to which the stimulating light is applied. Preferably, the conical projections 11 comprise quadrangular pyramids, triangular pyramids, circular cones, or the like. The conical projections 11 are spaced at a pitch p which should be close to the pixel pitch. The distance d between the display surface and bottom surfaces between the conical projections 11 should be as small as possible to minimize the propagation of luminescent light into the screen plate 10. A zone of the screen plate where luminescent light is emitted in response to applied stimulating light is in the vicinity of the bottom surfaces between the conical projections 11. Therefore, if the distance d was larger, the emitted luminescent light would not easily propagate into the screen plate 10, and the luminescent light directed toward the conical projections 11 would be reduced. For this reason, the distance d should be reduced as much as possible.

The apical angle $2\alpha$ of each of the conical projections 11 is selected to meet the following equation:

$$\sin\alpha = 1/\text{refractive index of the screen plate 10}$$

Therefore, the apical angle $2\alpha$ is selected to be below the critical angle of the screen plate 10. For example, if the screen plate 10 is made of an acrylic resin, then the angle $\alpha$ selected to be about 42°.

With the apical angle of each of the conical projections 11 being thus selected, luminescent light emitted in response to applied stimulating light and directed in a direction to pass through the screen plate 10 and in directions to be propagated into the screen plate 10 is trapped in and reflected by the conical projections 11. Therefore, the intensity of luminescent light directed toward the display surface of the screen plate 10 is increased, and hence the screen brightness is increased.

The conical projections 11 may be disposed on the display surface (the surface to which stimulating light is applied if the screen plate is incorporated in a front projector or the surface through which stimulating light passes if the screen plate is incorporated in a rear projector) of the screen plate 10, or on the reverse surface opposite to the display surface. However, it is more advantageous if the conical projections 11 are disposed on the reverse surface of the screen plate 10.

The reason for the above positioning of the conical projections 11 is as follows: According to the present invention, the angle of total reflection (i.e., the critical angle) between the screen plate 10 and air is employed to reflect back luminescent light. If stimulating light is applied to the screen plate from the flat surface thereof in a front projector, then emitted luminescent light that is directed away from the flat surface is reflected back by the conical projections, so that luminescent light of a large intensity is collected onto the flat surface of the screen plate. In a rear projector, luminescent light of a large intensity is also collected onto the flat surface of the screen plate. Since the flat surface of the screen plate becomes bright in each of the front and rear projectors, the conical projections 11 should be positioned on the surface opposite to the display surface of the screen plate.

With the present invention, the luminescent screen includes a regular array of convexes on one surface of the screen plate such that luminescent light emitted in response to applied stimulating light and directed to pass through and into the screen plate is reflected by the conical projections back toward the display surface of the screen plate. Accordingly, the intensity of luminescent light emitted from the display surface of the screen is increased. The screen brightness with respect to a reference intensity level of stimulating light is increased to a level which is about 2.5 times the conventional screen brightness level.

Although a certain preferred embodiment has been shown and described, it should be understood that many changes and modifications may be made therein without departing from the scope of the appended claims.

What is claimed is:

1. A luminescent screen comprising a screen plate made of a mixture of a transparent resin and a luminescent substance, said luminescent substance being capable of emitting luminescent light when stimulating light is applied thereto, wherein said screen plate is provided with a regular array of convexes on one surface thereof, each of said convexes having an equilateral triangle profile on the normal plane to said screen plate, said triangle having an apical angle $2\alpha$ determined so as to meet the following equation:

$$\sin\alpha = 1/\text{the refractive index of said screen plate}.$$

2. A luminescent screen according to claim 1, wherein said convexes comprise conical projections.

3. A luminescent screen according to claim 1, wherein said convexes comprise triangular pyramids.

4. A luminescent screen according to claim 1, wherein said convexes comprise quadrangular pyramids.

5. A luminescent screen according to claim 1, wherein said stimulating light is applied from the other surface opposite to said one surface of said screen plate, which is a display surface thereof.

* * * * *